US008457489B2

(12) United States Patent
Eiselt

(10) Patent No.: US 8,457,489 B2
(45) Date of Patent: Jun. 4, 2013

(54) METHOD FOR CONTROLLING THE CENTER WAVELENGTH OF AT LEAST ONE NARROW BAND OPTICAL CHANNEL WDM TRANSMITTING DEVICE IN A WDM NETWORK AND CORRESPONDING WDM TRANSMITTING DEVICE

(75) Inventor: Michael Eiselt, Kirchheim (DE)

(73) Assignee: ADVA Optical Networking SE, Meiningen (DE)

( * ) Notice: Subject to any disclaimer, the term of this patent is extended or adjusted under 35 U.S.C. 154(b) by 363 days.

(21) Appl. No.: 12/879,935

(22) Filed: Sep. 10, 2010

(65) Prior Publication Data

US 2011/0064411 A1 Mar. 17, 2011

(30) Foreign Application Priority Data

Sep. 11, 2009 (EP) ..................................... 09011653

(51) Int. Cl.
*H04J 14/02* (2006.01)
(52) U.S. Cl.
USPC .............................................. 398/34; 398/32
(58) Field of Classification Search
USPC ................................................ 398/30–34, 95
See application file for complete search history.

(56) References Cited

U.S. PATENT DOCUMENTS

| 6,396,603 | B1 | 5/2002 | Kim |
| 2002/0041414 | A1 | 4/2002 | Oguma |
| 2007/0154216 | A1* | 7/2007 | Kim et al. ....................... 398/71 |
| 2008/0279557 | A1 | 11/2008 | Park et al. |

FOREIGN PATENT DOCUMENTS

EP 0 436 202 A1 7/1991

OTHER PUBLICATIONS

EPO, Extended European Search Report dated Feb. 18, 2010, in European Application No. 09 011 653.4 (8 pages).
Randy Giles et al., "Fiber-Grating Sensor for Wavelength Tracking in Single-Fiber WDM Access PON's", IEEE Photonics Technology Letters, Apr. 1, 1997, pp. 523-525, vol. 9, No. 4 IEEE Service Center, Piscataway, NJ. (3 pages).
Hanns et al., "Uni-lambda bidirectional 10/1.25 GbE access service based on WDM-PON", Electronic Letters, Feb. 5, 2004, pp. 194-195, vol. 40, No. 3, IEE Stevenage, GB. (2 pages).

* cited by examiner

*Primary Examiner* — Leslie Pascal
(74) *Attorney, Agent, or Firm* — The Culbertson Group, P.C.

(57) ABSTRACT

The invention relates to a method for controlling the center wavelength of at least one narrow band WDM optical channel transmitting device in a WDM network. A reflected signal portion of a WDM channel signal is evaluated at the location of a WDM transmitting device. In order to generate the reflected signal portion, the optical multiplexing device or an additional reflective filter may be used, the additional filter revealing a low reflectivity at the desired channel center wavelength and a sharply increasing reflectivity adjacent thereto. The center wavelength of the WDM transmitting device is tuned to this target center wavelength by wavelength-modulating the center wavelength with a predetermined low modulation frequency and predetermined wavelength amplitude. The center wavelength of the WDM transmitting device is tuned such that the first order modulation frequency component of the reflected signal portion is minimized.

20 Claims, 4 Drawing Sheets

METHOD FOR CONTROLLING THE CENTER WAVELENGTH OF AT LEAST ONE NARROW BAND OPTICAL CHANNEL WDM TRANSMITTING DEVICE IN A WDM NETWORK AND CORRESPONDING WDM TRANSMITTING DEVICE

TECHNICAL FIELD OF THE INVENTION

The invention relates to a method for controlling the center wavelength of at least one narrow band optical channel WDM transmitting device in a WDM network and to a corresponding WDM transmission device as well as to a corresponding optical WDM transmission network.

BACKGROUND OF THE INVENTION

In wavelength division multiplex passive optical networks (WDM-PONs), each customer or optical network unit (ONU) communicates with the central office or optical line terminal (OLT) on a distinct wavelength. The wavelengths are combined via a multiplexing device which may be, for example, realized as an arrayed waveguide grating (AWG) in a remote node (RN), or via a distributed filter structure, before the WDM signal is sent to the OLT. To ensure proper combination in the multiplexing device, the center wavelengths of the optical channel signal which are generated in the ONUs need to be on a precise grid with a deviation of only few GHz. Furthermore, each ONU wavelength needs to match the port of the multiplexing device to which it is connected. For this purpose, the correct laser wavelength needs to be chosen. WDM transmitting devices which enable tuning of the center wavelength of the generated optical WDM channel signal are widely known. The tuning of the center wavelength may be enabled for only a rather small wavelength range which allows to correct small deviations of the center wavelength of the channel signal from the center wavelength of the respective channel transmission band. Further, WDM transmitting devices are known which enable wavelength tuning over a rather large spectral range, so such devices may be used to generate any required channel signal of a predetermined number of WDM channels.

It is at any rate desirable to enable the exact tuning of the center wavelength of a channel signal to the desired target wavelength, namely, the center wavelength of the predefined optical WDM channel. Generally, this center wavelength is predefined by the optical characteristics of the multiplexing device used to combine the plurality of optical channel signals.

SUMMARY OF THE INVENTION

It is an object of the present invention to provide a method for controlling the center wavelength of at least one narrow band WDM optical channel transmitting device in a WDM network which is easy to implement and which allows to tune the center wavelength of an optical channel signal with high accuracy to the respective target wavelength defined by the WDM multiplexing device of a corresponding WDM transmission network. Moreover, it is an object of the invention to provide a corresponding optical WDM transmitting device which allows to implement the method according to the invention as well as to provide a corresponding optical WDM transmission network.

Methods according to the invention may utilize an optical reflection means for wavelength-selectively reflecting back a portion of a respective channel signal which is fed to a near end of a respective optical channel waveguide adapted to feed the channel signal to a designated channel port of a multiplexing device, the wavelength-selective means generally having a low reflectivity in the wavelength region of the center wavelength of the respective optical WDM channel and a sharply increasing reflectivity aside from the center wavelength of the respective optical WDM channel. Thus, if the center wavelength of the respective channel signal is not exactly tuned to the center wavelength of the reflection means, a larger portion of the optical power contained in the channel signal is reflected than in case of an exact match of the center wavelengths.

According to the invention the reflective means may be realized by

- the optical characteristics of the optical multiplexing device; or
- by an optical reflective filter provided in the optical path of the WDM signal which is output by the WDM port of the optical multiplexing device, the optical reflective filter defining a wavelength reflectivity having a notch at essentially the center wavelength of the wavelength transmission band of said optical channel port, where at the center wavelength the filter reflectivity is low and aside from the center wavelength the filter reflectivity increases sharply; or
- by an optical reflective filter which is coupled to the optical path of the WDM signal output by the WDM port of the optical multiplexing device by means of a splitting device such that a smaller portion of the optical WDM signal is fed into the optical path of the WDM signal, the optical reflective filter defining a wavelength reflectivity having a notch at essentially the center wavelength of the wavelength transmission band of said optical channel port, where at the center wavelength the filter reflectivity is low and aside from the center wavelength the filter reflectivity increases sharply.

In case of the last alternative mentioned, the reflective filter may also be designed such that reflectivity of the optical reflective filter has a positive notch (i.e. a peak) at essentially the center wavelength of the wavelength transmission band of said optical channel port, where at the center wavelength the filter reflectivity is high and aside from the center wavelength the filter reflectivity decreases sharply. Here, of course, the center wavelength of the channel signal must be controlled such that the reflected portion is maximized, whereas generally (i.e. in the other alternatives described above) the center wavelength of the respective channel signal must be controlled such that the reflected portion is minimized.

According to the invention the wavelength of the optical channel signal is modulated with a given frequency and amplitude. The modulation amplitude shall, for the following description, be defined as the maximum (symmetric) deviation of the modulated channel wavelength from the center wavelength, where the center wavelength is the peak wavelength of the narrow-band spectrum of the channel signal without modulation. The modulation frequency is chosen to be rather low (e.g. several hundred Hz to several 10 s of kHz) which, on the one hand, enables a simple phase-sensitive detection of the modulation components of the reflected signal and, on the other hand, enables to use the method even in connection with a use signal containing information to be transmitted via the respective optical channel signal. In other words, the optical channel signal may be a use signal where the center wavelength is modulated as described above.

The modulation amplitude must be chosen such that the bandwidth of the modulated optical channel signal is narrower than the bandwidth of said wavelength transmission band. Otherwise, there is a risk of disturbing other channels of the WDM transmission network due to crosstalk.

According to a preferred embodiment of the invention, a further electrical monitoring signal is created corresponding to the power included in the second order modulation frequency component of the reflection signal. This further electrical signal is monitored in order to verify that the center wavelength of said optical channel signal falls within the wavelength transmission band of said channel port. An exemplary criterion for determining whether or not this condition is fulfilled is to examine whether the detected second order modulation frequency component is detected with a predetermined minimum power exceeding a predetermined threshold value.

It is to be noted that, for the purpose of this description, the term "fundamental" or "first order modulation component" is to be understood as the component at the modulation frequency and that the components at the twofold or generally n-fold modulation frequency are designated as second order modulation components or generally as modulation components of order n (n being an integer equal to or greater than two).

According to a preferred embodiment of the invention, the modulation amplitude is less than 50%, preferably less than 20% of said wavelength transmission band. In high end DWDM (dense wavelength division multiplex) transmission systems revealing a channel spacing of 50 GHz, a typical transmission band or passband for a WDM channel may lie in the region of 12 GHz (or ±6 GHz around the channel center wavelength). In such a system the modulation amplitude should preferably lie in the region of ±1 to ±2 GHz, that is in the region of less than 20% of the passband of 12 GHz.

The electrical monitoring signal and the further electrical monitoring signal are preferably created through narrow band pass filtering of the electrical reflection signal where the center frequency of the filter band corresponds to the modulation frequency or the twofold modulation frequency, respectively. According to a preferred embodiment this narrow-band filtering is effected through a phase-sensitive detection of the reflection signal, the modulation frequency or twofold modulation frequency being used as reference frequency.

According to different embodiments the control method may be applied continuously, thereby minimizing the optical power of the reflected portion of the optical channel signal continuously, or the method may be applied at predetermined points in time or in predetermined time intervals, where the center wavelength of the optical transmitting device is kept constant after a minimization procedure has been run through. However, as the method is preferably applied using as channel signal the information or use signal to be transmitted of the WDM transmission network, a continuous application of the control method is advantageous.

The method according to the invention is easy to implement as merely a modulation of the center wavelength of the corresponding channel signals needs to be effected, which is an easy task for wavelength-tunable lasers being used as optical transmitter units.

These and other advantages and features of the invention will be apparent from the following description of the preferred embodiments, considered along with the accompanying drawings.

BRIEF DESCRIPTION OF THE DRAWINGS

The invention will now be described in further detail with respect to the embodiments shown in the Figures included in the drawing, wherein.

DESCRIPTION OF ILLUSTRATIVE EMBODIMENTS

Figure 1:
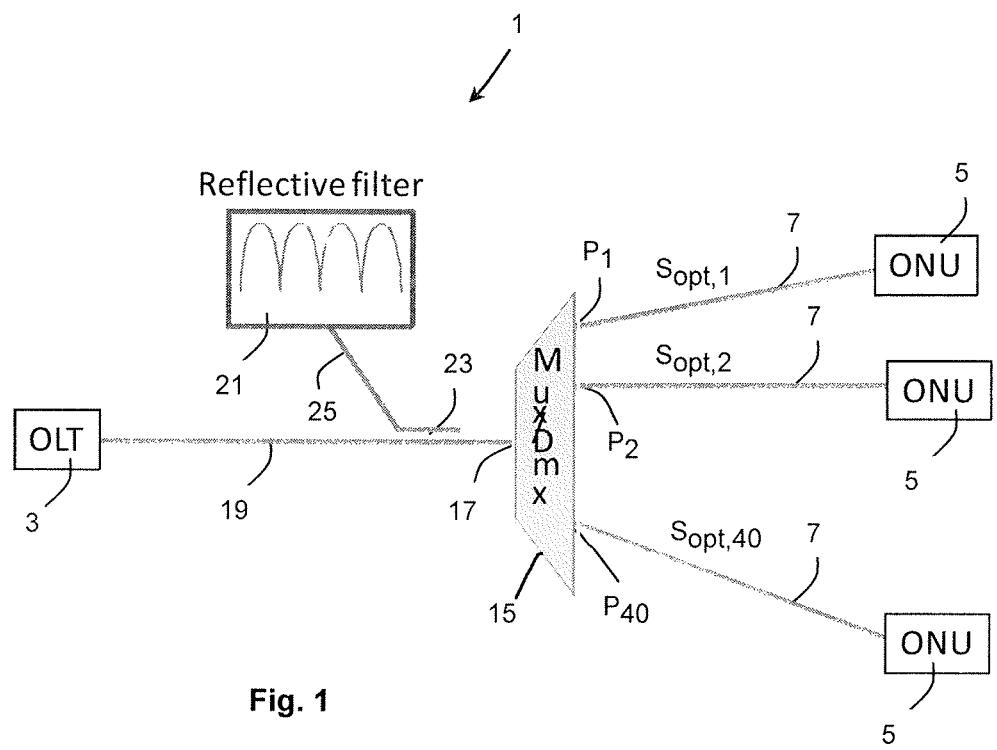
FIG. 1 shows a schematic block diagram of a WDM transmission system according to one form of the invention, between an optical line terminal and a plurality of optical node units.
Figure 2:
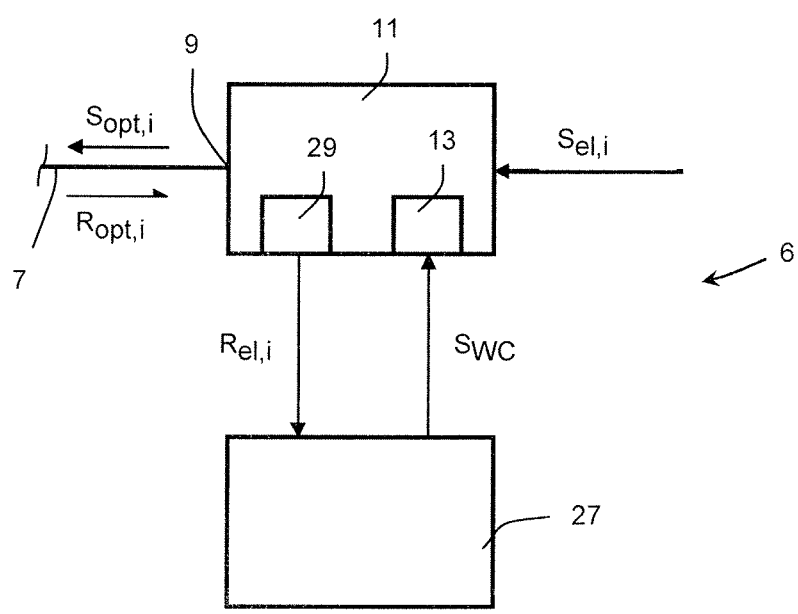
FIG. 2 shows a schematic block diagram of a WDM transmitting device included in each optical node unit of FIG. 1.

FIG. 1 shows a schematic block diagram of the essential components of a WDM transmission system 1 between an optical line terminal (OLT) 3 and a plurality of optical node units (ONU) 5. Each ONU 5 includes a WDM transmitting device 6 as shown in FIG. 2. A channel signal output port 9 of a transmitter unit 11 included in the WDM transmittting device is connected to a near end of an optical channel waveguide 7. The transmitter unit 11 may include a tunable laser diode as an optical transmitting element. The optical channel signal $S_{opt,i}$ generated by the WDM transmitting device 6 is coupled into the channel waveguide 7. Each transmitter unit 11 is adapted to generate the respective optical channel signal $S_{opt,i}$ according to a corresponding electrical digital data information signal (use signal) $S_{e1,i}$ where i denotes the channel number (e.g. 1≦i≦40) at a predetermined channel center wavelength. The channel center wavelengths are usually provided according to a fixed channel grid at a fixed channel spacing of for example 50 or 100 GHz. The channel signals (including the modulation according to the use signal) reveal a narrow-band spectrum that fits within the narrow-band channel passband of the WDM transmission system which is for example ±6 GHz around a respective target center wavelength. As the narrow-band spectrum of the corresponding channel signal is in the region of the channel passband, the center wavelength of the channel must be exactly tuned to the respective target center wavelength. This is effected by applying a respective wavelength control signal $S_{WC}$ to a wavelength control and modulation unit 13 included in the transmitter unit 11.

A remote end of each optical channel waveguide 7 is connected to a dedicated channel port Pi (P1 to $P_{40}$ in the embodiment according to FIG. 1) of an optical multiplexing device 15, thereby feeding the respective optical channel signal $S_{opt,i}$ to the respective channel port Pi. The multiplexing device 15 has, of course, also demultiplexing properties, that is, the multiplexing device 15 does not only serve as a multiplexer in order to combine the optical channel signals $S_{opt,i}$ to a WDM signal $S_{WDM}$ at a WDM port 17 of the multiplexing device, but does also serve as a demultiplexing device that splits a WDM signal fed to the WDM port 17 into separate signals which are fed in the direction of the respective channel port Pi. In this reverse transmission direction (demultiplexing direction) the same filter properties of the multiplexing device 15 are applied to the WDM signal $S_{WDM}$ as in the multiplexing direction.

The multiplexing device 15 may be realized by one or more arrayed waveguide gratings (AWG) or any other optical filter elements which are able to combine the optical channel signals at the different center wavelengths and to transmit this combined WDM signal into a single optical path. In FIG. 1 this optical path of the WDM signal $S_{WDM}$ is realized as optical WDM waveguide 19. The multiplexing device may also be realized as distributed structure using respective optical components. The multiplexing device also defines the narrow-band channel passbands of the WDM transmission system.

As shown in FIG. 1, a reflective filter 21 is connected to the optical WDM waveguide 19 carrying the WDM signal $S_{WDM}$ through a 1×2 optical coupler 23. The optical 1×2 coupler splits the WDM signal $S_{WDM}$ and couples a rather small amount of the optical power of the WDM signal $S_{WDM}$ into an optical waveguide 25 feeding the respective portion of the WDM signal $S_{WDM}$ to the reflective filter 21.

Filter 21 has a reflectivity designed such that the reflectivity is low (or almost zero) at each center wavelength of the WDM channel passbands and increases sharply aside from the center wavelengths so that it reveals the property of an optical comb filter having notches in the reflectivity at the WDM channel center wavelengths.

If the center wavelength of the respective channel signal $S_{opt}$ coincides with the respective target wavelength (i.e. the respective center wavelength of the corresponding WDM channel passband which is equal to the center wavelength of the respective notch of the filter reflectivity), the reflected portion of the optical power generated by the respective transmitter unit 11 is at a minimum. Thus, measuring the reflected optical power at the respective channel signal output port 9 can be used to tune the center wavelength of the respective transmitter 11 to the target wavelength.

For this purpose, each WDM transmitting device 6 includes a control unit 27 which generates a suitable wavelength control signal $S_{WC}$.

The wavelength generated in each WDM transmitting device 6 is periodically modified/modulated with an amplitude of for example 1-2 GHz around a respective center wavelength (the center wavelength shall be defined as arithmetic mean value between the maximum and minimum wavelength value). Of course, the center wavelength of the ONU can additionally be modified. When the wavelength spectrum transmitted by the respective transmitter unit lies within the respective pass-band of the multiplexing device with at least part of the spectrum, the signal (filtered according to the filter function of the multiplexing device) reaches the reflective filter and is reflected according to the respective filter reflectivity. The reflected signal passes the multiplexing device 15 in reverse direction and reaches the originating transmitter unit 11. This is an indication that the ONU is tuned to the correct channel.

Each transmitter unit 11 includes an optical detector unit 29 which receives the reflected optical signal $R_{opt,i}$ and generates a corresponding electrical reflection signal $R_{e1,i}$ proportional to the optical power of the reflected optical signal $R_{opt,i}$.

As explained above, the reflectivity of the reflective filter 21 has periodic notches at the center of each channel band, such that at optimum wavelength setting no power is reflected. As, however, the center wavelengths generated by the transmitter units 11 are varied periodically, the power of the respective reflected signals $R_{opt,i}$ or $R_{e1,i}$, respectively, also varies periodically.

Figures 3A, 3B, 3C:
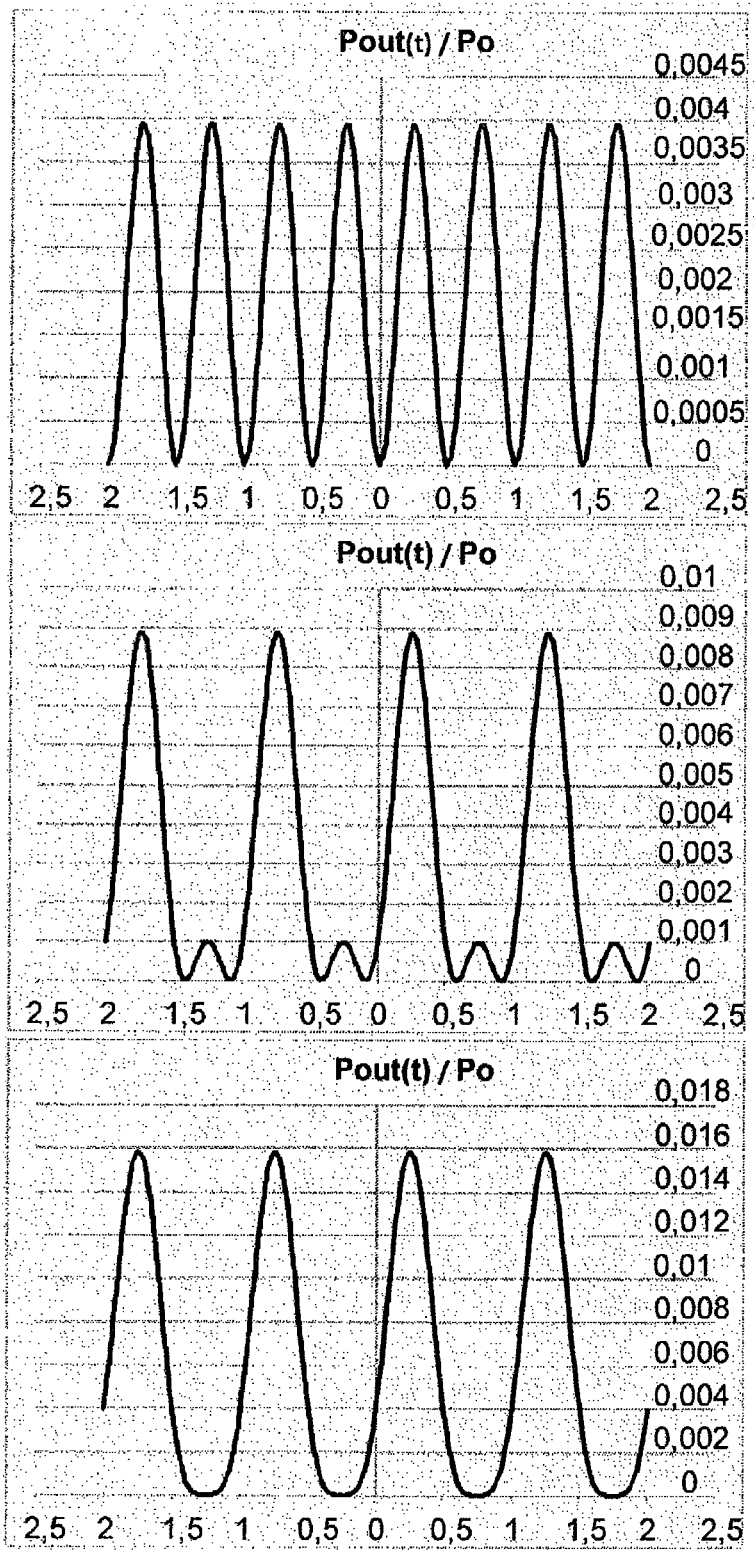
FIG. 3 includes three diagrams depicting the power variations of the reflected optical signal detected at the output port of the WDM transmitting device in case the center wavelength of the channel signal is at the target wavelength (i.e. at the center wavelength of the reflection means) (FIG. 3a), or in case the center wavelength reveals a deviation from the target wavelength of 500 MHz (FIG. 3b) and 1 GHZ (FIG. 3c), where the filter reveals a periodicity of 50 GHz and the modulation amplitude is 1 GHz.

FIG. 3 shows the variations of the reflected power as a function of time. For this example a WDM passband structure and also a reflectivity of the reflective filter 21 having a 50 GHz periodicity and a wavelength modulation amplitude of +/−1 GHz was assumed. In case of FIG. 3a, the center wavelength of the respective channel signal $S_{opt,i}$ is exactly on the grid coinciding with the respective notch frequency, while in case of FIG. 3b and FIG. 3c, the respective center wavelength differs from the notch frequency by a differential frequency of 500 MHz and 1 GHz, respectively.

It can be seen that if the modulated channel signal $S_{opt,i}$ has a wavelength spectrum that includes the target wavelength (defined by the reflective filter), the reflected signal $R_{opt,i}$ also includes a component at the twofold modulation frequency (second harmonic component). No second harmonic component is visible if the target wavelength does not lie within the spectrum of the modulated channel signal $S_{opt,i}$. This is the case for the frequency shift of 1 GHz assumed in FIG. 3c.

Thus, the control unit 27 may detect the corresponding reflected electrical signal $R_{e1,i}$ and generate the wavelength control signal $S_{WC}$ depending on the signal strength of the first or fundamental harmonic of the signal $R_{e1,i}$ which, of course, corresponds to the optical power of the first harmonic of the reflected signal $R_{opt,i}$ detected by the detector unit 29. The strength of the first harmonic serves as a measure for the optical power of the reflected signal. Further, the control unit 27 may also detect the strength of the second harmonic of the signal $R_{e1,i}$ and use this information in order to determine whether or not the center wavelength of the respective optical channel lies within the respective WDM passband. This is important as in case of a complete mismatch the center wavelength of the channel signal $P_{opt,i}$ may be out of tune to an extent that the multiplexing device does not feed the signal to the WDM output port 17 but to another channel port $P_i$, or even in case a signal is fed to filter 21, the multiplexing device supplies the reflected signal to a different channel port $P_j$ (j≠i).

The fundamental modulation frequency component of the detected signal $R_{e1,i}$ is measured by the control unit either using a filter or a lock-in method. The power in this fundamental modulation frequency component is minimized by varying the wavelength of the respective transmitter unit 11 towards the target wavelength. When a lock-in technique is used, the relative phases of the modulation signal and the reflected signal are an indication of the sign of the frequency difference.

Part of the optical power generated in the ONU and travelling towards the OLT is also reflected or scattered back at fiber splices or at fiber impurities. However, these reflected power components do not vary to a large extent with the frequency modulation of the signal as the wavelength dependency of these reflection mechanisms is low.

Therefore, monitoring the first and second harmonics of the modulation signal in the received power will suppress any spurious reflections.

According to the invention, the reflective filter 21 may also reveal an inverted reflectivity, that is, the reflectivity at a notch may be high and sharply decreasing adjacent hereto. In this case, the reflected power of the reflected signal is at a maximum if the center wavelength of the respective channel signal is exactly tuned to the target wavelength. Thus, the control unit must, in this case, generate the wavelength control signal $S_{WC}$ such that the signal $R_{e1,i}$ is maximized. In this case, it is unnecessary to monitor the second harmonic as the wavelength is tuned to maximum reflection.

It is also possible to provide the reflective filter 21 with the optical path of the WDM waveguide 19. The method explained above may be applied accordingly. However, in this embodiment, the actual transmission properties may be influenced by the characteristics of filter 21.

In case the multiplexing device 15 has reflective properties comparable to the afore-mentioned properties of the reflective filter 21, an additional reflective filter may be unnecessary in order to realize the above method.

Of course, the method explained above may be applied with respect to only one WDM channel or WDM transmitting device or with respect to more than one or even with respect to all channels or all WDM transmitting devices, respectively.

It should also be noted that even if the respective functions of the transmitter units 11 and the control units 27 have been explained with respect to separate units, the corresponding functions may be effected by a combined unit or electronic circuits which are realized in a distributed manner. It is, for example, of course possible to include some functions of the control unit 27 within the wavelength control and modulation unit 13 and vice versa.

As explained above, control unit 27 may generate the wavelength control signal $S_{WC}$ such that if fully controls the center wavelength as a function of time of the respective channel signal $S_{opt,i}$ including the variation or modulation of the center wavelength. In another alternative, it is of course possible that the control unit 27 only generates a wavelength control signal controlling the real center wavelength of the channel signal $S_{opt,i}$ (i.e. without the variation according to a predetermined amplitude) and that the wavelength control and modulation unit 13 uses the respective center wavelength (defined by the wavelength control signal $S_{WC}$) and adds a predetermined amplitude modulation to this signal. The amplitude may, in this case, be stored in the wavelength control and modulation unit 13. The respective amplitude value may also be delivered to the wavelength control and modulation unit 13 by the control unit 27.

In order to distinguish, at a WDM transmitting device, the correct reflected signal from other reflected signals (for example due to out-of-tune channel signals of other WDM transmitting devices), each WDM transmitting device may use a sufficiently different modulation frequency. As it is advisable to apply narrow-band filtering for the detection of the reflected signal, corresponding disturbances or errors can be eliminated.

A possible realization of the reflective filter uses a Fabry-Perot interferometric filter, which is tuned to lowest reflection at the center of the channel. The Fabry-Perot interferometric filter is either used in-line such that the main signal stream passes the filter and is sent to the OLT, or a part of the signal power is tapped off using a 1×2 coupler 23, then reflected at the reflective filter 21 and coupled back towards the multiplexing device 15 and the WDM transmitting device 6. In the latter version, the WDM signal does not experience the filter function of the filter 21.

Figure 4:
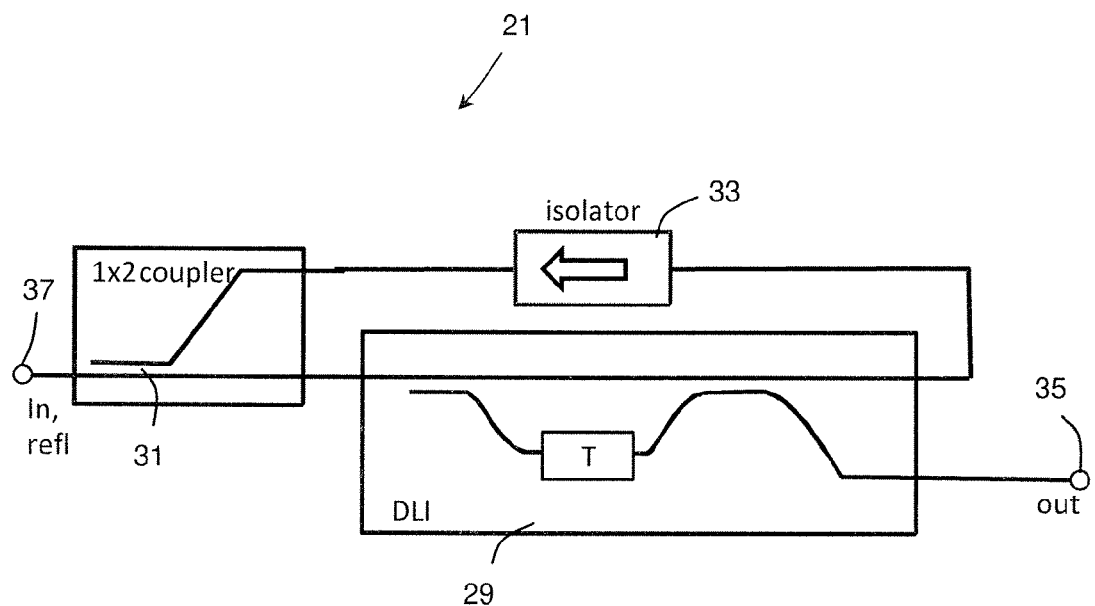
FIG. 4 shows a schematic block diagram of a first realization of a reflective filter for the system in FIG. 1.

A second realization of the reflective filter 21, as shown in FIG. 4, uses a delay-line interferometer 29 with a free spectral range of the WDM channel frequency grid (or a fraction of it), a 1×2 coupler 31, and an isolator 33. The delay-line interferometer 29 is tuned such that all wavelengths coinciding with the channel grid are transmitted to the output port 35. The other output port of the delay-line interferometer 29 (suppression of on-grid wavelengths) is looped back to the input port 37 via isolator 33 and 1×2 coupler 31. It should be mentioned that for an FSR of 50 GHz the 1 dB-bandwidth of this filter for the signal transmitted at the output port is about 15 GHz, sufficient for a 10 Gb/s data signal.

Figure 5:
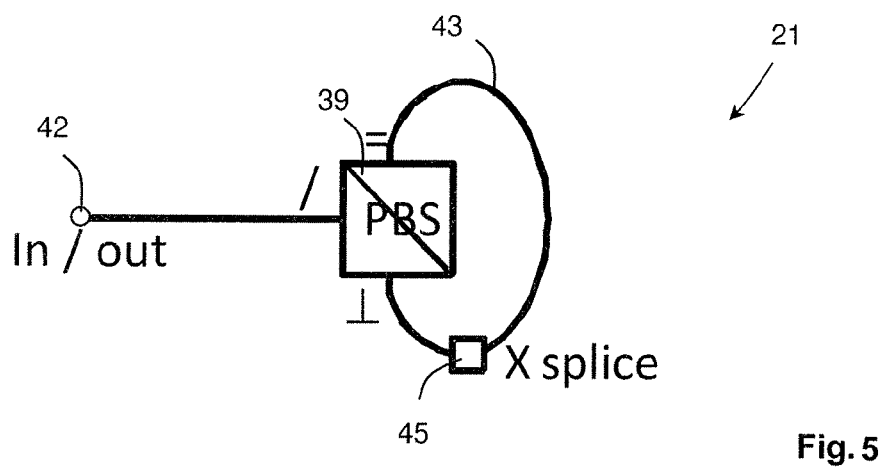
FIG. 5 shows a schematic block diagram of a second realization of a reflective filter for the system in FIG. 1.

Another realization of the reflective notch filter is depicted in FIG. 5. This filter type uses a polarization beam splitter 39 and sends two parts of the signal applied to an input/output port 41 in different polarizations through a predetermined length of a birefringent (polarization maintaining) fiber 43 with a propagation delay of 1/FSR (free spectral range). In order to secure that the respective signal parts are directed back to the input/output port 41 a cross splice 45 is provided within fiber 39. At the cross splice 45 the fiber output at this setup requires two of these components to realize a polarization diversity scheme. While the two afore-mentioned filter structures may be used inline or in connection with a split portion of the WDM signal $S_{WDM}$, the last alternative can only be used as reflective filter 21 in a situation as depicted in FIG. 1, that is in connection with a split portion of the WDM signal $S_{WDM}$.

To ensure that the filter notches of filter 21 exactly coincide with the grid center frequencies, several methods can be used:

The simplest method is, of course, to use an athermal device which is calibrated and does not change its reflectivity over time or temperature. This device type does not require calibration.

If calibration is required, an optical transmitting element such as a laser may be added at the same location as filter 21. The transmitting element can be coupled to a calibrated wave locker. The optical narrow-band signal of this additional transmitting element may be added to the WDM signal via a free port of the multiplexing device 15. The additional transmitting element is wavelength-modulated similarly to the transmitter units 11 of the WDM transmitting devices 6. The reflected signal is monitored (preferably at the filter location) and the reflective filter 21 is tuned such that the fundamental modulation frequency component reflected to the local laser is minimized. In this way, the reflective filter is coupled in wavelength to the locally wavelength-locked transmitting element. In other words, almost the same optimization method is applied for calibration purposes as explained above for wavelength tuning purposes. Instead of generating a wavelength control signal $S_{WC}$, a filter control signal is generated. For example, the filter control signal may be a control signal for controlling the temperature of a temperature control element keeping the filter 21 at a desired constant temperature.

Instead of an additional transmitter element provided at the filter location, one of the wavelengths coming from the OLT can be used for calibration purposes. The corresponding transmitter unit must then provide a wavelength-locked signal. The corresponding signal can either use an unused wavelength (i.e. an unused channel is used for the filter calibration) or a wavelength that is used for transmitting a use signal. However, the corresponding reflected signal portion of this channel signal is not used to control or adjust the actual wavelength of the channel signal (as this is already wavelength-locked), but to control the reflectivity of filter 21. The reflected signal is monitored after traversing the multiplexing device 15 in reverse direction, and the filter is tuned to minimize the fundamental modulation frequency. In this way, the filter is coupled to a frequency, stabilized at the OLT. The control information may be transmitted from the control unit 27 of the respective WDM transmitting device to the unit controlling the filter reflectivity (e.g. a temperature control device) via the optical channel signal that is at least partially transmitted to the filter location. In this case, a corresponding receiving and control unit must be provided at the filter location that detects the control signal from the optical signal transmitted to the filter location and correspondingly sets the respective parameter (e.g. the temperature) of the filter control unit.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The invention claimed is:

1. A method for controlling the center wavelength of a narrow band WDM optical channel transmitting device in a WDM network, the method including:
   (a) coupling the optical channel signal created by the optical channel transmitting device into a near end of an optical channel waveguide, a remote end of the optical channel waveguide being coupled to a channel port of an optical multiplexing device, wherein the channel port defines a wavelength transmission band and the optical multiplexing device is designed such that the optical channel signal is included in an optical WDM signal output at a WDM port of the optical multiplexing device;
   (b) periodically modulating the center wavelength of the optical channel signal with a predetermined modulation frequency and amplitude to produce a modulated optical channel signal having a bandwidth narrower than the bandwidth of the wavelength transmission band;
   (c) at the near end of the optical channel waveguide, detecting the optical power of a reflected portion of the optical channel signal as a function of time, and creating a corresponding electrical reflection signal, wherein the reflected portion of the optical channel signal comprises either,
      (i) a first type reflected signal produced by a first type device which exhibits a relatively low reflectivity at the center wavelength of the optical channel signal and a sharply increasing reflectivity aside from the center wavelength, or
      (ii) a second type reflected signal produced by a second type device which exhibits a relatively high reflectivity at the center wavelength of the optical channel signal and a sharply decreasing reflectivity aside from the center wavelength, the second type device being coupled to the optical path of the WDM signal output from the WDM port of the optical multiplexing device by means of a splitting device which directs a portion of the optical WDM signal to the second type device;
   (d) creating from the electrical reflection signal an electrical monitoring signal corresponding to the power included in the fundamental modulation frequency components of the detected reflected portion of the optical channel signal; and
   (e) controlling the center wavelength of the optical channel signal such that the electrical monitoring signal is minimized when the reflected portion of the optical channel signal comprises the first type reflected signal, and controlling the center wavelength of the optical channel signal such that the electrical monitoring signal is maximized when the reflected portion of the optical channel signal comprises the second type reflected signal.

2. The method of claim 1 wherein the reflected portion of the optical channel signal comprises the first type reflected signal and the first type device comprises:
   (a) the optical multiplexing device; or
   (b) an optical reflective filter provided in the optical path of the WDM signal which is output from the optical multiplexing device WDM port, the optical reflective filter defining a wavelength reflectivity having a notch at essentially the center wavelength of the wavelength transmission band of said optical channel port, where at the center wavelength the filter reflectivity is relatively low and aside from the center wavelength the filter reflectivity increases sharply; or
   (c) an optical reflective filter which is coupled to the optical path of the WDM signal output from the WDM port of the optical multiplexing device by means of a splitting device which directs a portion of the WDM signal to the optical reflective filter, the optical reflective filter defining a wavelength reflectivity having a notch at essentially the center wavelength of the wavelength transmission band of said optical channel port, where at the center wavelength the filter reflectivity is relatively low and aside from the center wavelength the filter reflectivity increases sharply.

3. The method of claim 1 wherein the second type device comprises an optical reflective filter defining a wavelength reflectivity having a notch at essentially the center wavelength of the wavelength transmission band of said optical channel port, where at the center wavelength the filter reflectivity is relatively high and aside from the center wavelength the filter reflectivity decreases sharply.

4. The method of claim 1 wherein the amplitude of the modulation of the center wavelength is less than 50% of the wavelength transmission band.

5. The method of claim 1 further including:
   (a) creating a further electrical monitoring signal corresponding to the power included in the second order modulation frequency component of the electrical reflection signal; and
   (b) monitoring the further electrical signal in order to verify that the center wavelength of the optical channel signal falls within the wavelength transmission band of the channel port.

6. The method of claim 5 wherein the electrical monitoring signal and the further electrical monitoring signal are created through band pass filtering of the electrical reflection signal where the center frequency of the filter band corresponds to the modulation frequency or the twofold modulation frequency, respectively.

7. The method of claim 6 wherein the band pass filtering of the reflection signal is effected by a phase-sensitive detection of the reflection signal.

8. The method of claim 1 wherein the method is continuously applied thereby continuously minimizing the optical power of the reflected portion of the optical channel signal.

9. The method of claim 1 wherein the method is applied at predetermined points in time or in predetermined time intervals, where the center wavelength of the optical channel transmitting device is kept constant after a minimization procedure.

10. An optical WDM transmitting device for a WDM transmission network, the WDM transmission network including a wavelength-selective reflection device for wavelength-selectively reflecting back a portion of one or more channel signals which are fed to respective near ends of optical channel waveguides, the wavelength-selective reflection device comprising either (i) a first type reflection device having a relatively low reflectivity in the wavelength region of the center wavelength of the respective optical WDM channel and a sharply increasing reflectivity aside from the center wavelength of the respective optical WDM channel, or (ii) a second type reflection device adapted to receive only a portion of the power of the respective optical WDM channel and having a relatively high reflectivity in the wavelength region of the center wavelength of the respective optical WDM channel and a sharply decreasing reflectivity aside from the center wavelength of the respective optical WDM channel, the optical WDM transmitting device including:

(a) a transmitter unit adapted to create and output, at a channel signal output port, an optical channel signal corresponding to a digital electrical information data signal, the optical channel signal having a predetermined bandwidth and center wavelength;

(b) the transmitter unit including (i) an optical detector unit for opto-electrically converting an optical signal received at the channel signal output port into an electrical reflection signal and (ii) a wavelength control and modulator unit adapted to control the center wavelength of the optical channel signal to a desired value and to effect a modulation of the center wavelength at least periodically with a predetermined modulation frequency and amplitude, the bandwidth of the modulated optical channel signal being narrower than the bandwidth of the optical channel signal;

(c) a control unit adapted to receive the electrical reflection signal from the optical detector unit and to create an electrical monitoring signal corresponding to the electrical reflection signal component at the fundamental modulation frequency and to create, depending on the electrical monitoring signal, a wavelength control signal and feed the wavelength control signal to the wavelength control and modulator unit, where the wavelength control signal is created such that the electrical monitoring signal is (i) minimized where the wavelength-selective reflection device comprises the first type reflection device, and is (ii) maximized where the wavelength-selective reflection device comprises the second type reflection device; and (d) wherein the optical WDM transmitting device is adapted to be coupled with the channel signal output port to a near end of an optical channel waveguide of the WDM transmission system, a remote end of the optical channel waveguide being coupled to a channel port of an optical multiplexing device, thereby feeding said optical channel signal to said channel port, said optical multiplexing device defining, with respect to said channel port, a narrow wavelength transmission band, the optical multiplexing device being designed such that the optical channel signal is included in an optical WDM signal which is output at a WDM port of the optical multiplexing device.

11. The optical WDM transmitting device of claim 10 wherein the control unit is adapted to create a further monitoring signal corresponding to the electrical reflection signal component at the twofold frequency and to use this further monitoring signal in order to verify that the center wavelength of the respective optical channel signal falls within the wavelength transmission band of the respective channel port.

12. The optical WDM transmitting device of claim 10 wherein the amplitude of the modulation of the center wavelength is less than 50% of the wavelength transmission band of the respective channel signal.

13. The optical WDM transmitting device of claim 10 characterized in that the monitoring signal is created by means of an electrical narrow-band filter or a lock-in amplifier included in the control unit.

14. The optical WDM transmitting device of claim 10 wherein the control unit continuously evaluates the electrical reflection signal and creates the wavelength control signal.

15. The optical WDM transmitting device of claim 10 wherein the control unit periodically evaluates the electrical reflection signal and creates the wavelength control signal, and then maintains the wavelength control signal constant for a period of time.

16. An optical WDM transmission network including:

(a) a plurality of optical channel waveguides each having a near end and a remote end, each remote end being coupled to a respective channel port of an optical multiplexing device, the optical multiplexing device defining, with respect to each respective channel port, a narrow wavelength transmission band for a respective WDM channel, the optical multiplexing device being designed such that each respective optical channel signal fed to a respective channel port is integrated into an optical WDM signal which is output at a WDM port of the optical multiplexing device;

(b) a wavelength-selective reflection device for wavelength-selectively reflecting back a portion of one or more optical channel signals which are fed to respective near ends of the optical channel waveguides, the wavelength-selective reflection device comprising either (i) a first type reflection device having a relatively low reflectivity in the wavelength region of the center wavelength of the respective optical WDM channel and a sharply increasing reflectivity aside from the center wavelength of the respective optical WDM channel, or (ii) a second type reflection device connected to receive only a portion of the power of the respective optical WDM channel and having a relatively high reflectivity in the wavelength region of the center wavelength of the respective optical WDM channel and a sharply decreasing reflectivity aside from the center wavelength of the respective optical WDM channel;

(c) a plurality of optical WDM transmitting devices, each optical WDM transmitting device being coupled to a near end of a respective optical channel waveguide, where each WDM transmitting device includes, (i) a transmitter unit being adapted to create and output, at a respective channel signal output port, a respective optical channel signal corresponding to a respective digital electrical information data signal, the respective optical channel signal having a respective predetermined bandwidth and center wavelength, each transmitter unit further including:

(1) an optical detector unit for opto-electrically converting a respective optical signal received at the respective channel signal output port into an electrical reflection signal, and (2) a wavelength control and modulator unit adapted to control the respective center wavelength of the respective optical channel signal to a desired value and to effect a periodic modulation of the center wavelength with a predetermined modulation frequency and amplitude, the bandwidth of the modulated optical channel signal being narrower than the bandwidth of the respective wavelength transmission band; and (ii) a control device adapted to receive the respective electrical reflection signal from the optical detector unit and to create an electrical monitoring signal corresponding to the electrical reflection signal component at the fundamental modulation frequency and to create, depending on the respective electrical monitoring signal, a wavelength control signal and to feed the wavelength control signal to the respective wavelength control and modulator unit, where the wavelength control signal is created such that the corresponding electrical monitoring signal is minimized where the wavelength-selective reflection device comprises the first type reflection device, and is maximized where the wavelength-selective reflection device comprises the second type reflection device.

17. The optical WDM transmission network of claim 16 wherein that the wavelength-selective reflection device comprises an optical Fabry-Perot interferometric filter.

18. The optical WDM transmission network of claim 16 wherein the wavelength-selective reflection device comprises the first type reflection device which comprises a delay-line interferometric filter having an input port and an output port, the input port being coupled to a common port of a 1×2 splitter device, a first output port of the 1×2 splitter device being coupled to an optical delay-line interferometer having two output ports, where a first output port of the delay-line interferometer is coupled to the output port of the delay-line interferometric filter and a second output port of the delay-line interferometer is coupled to an input port of an optical isolator, the output port of the optical isolator being coupled to a second output port of the 1×2 splitter device, the optical characteristics of the delay-line interferometric filter being designed such that a relatively low reflectivity is given in the wavelength region of the center wavelength of the respective optical WDM channel and a sharply increasing reflectivity is given aside from the center wavelength of the respective optical WDM channel.

19. The optical WDM transmission network of claim 16 wherein the wavelength-selective reflection device comprises the first type reflection device which comprises an interferometric filter having a combined input/output port, the interferometric filter including a polarization beam splitter, the input port of which is coupled to the combined input/output port, a first and a second output port of the polarization beam splitter being connected via a birefringent polarization maintaining optical waveguide, the polarization orientation of the optical waveguide being turned by 90 degrees between the first and second output ports.

20. The optical WDM transmission network of claim 16 wherein the wavelength-selective reflection device comprises the first type reflecting device and the first type reflecting device comprises:
(a) the optical multiplexing device; or
(b) an optical reflective filter provided in the optical path of the WDM signal which is output by the WDM port of the optical multiplexing device; or
(c) an optical reflective filter which is coupled to the optical path of the WDM signal output by the WDM port of the optical multiplexing device by means of a splitting device which directs only a portion of the power of the WDM signal to the optical reflective filter.

\* \* \* \* \*